(12) United States Patent
Winter et al.

(10) Patent No.: US 12,358,549 B2
(45) Date of Patent: Jul. 15, 2025

(54) DRIVE CONTROL SYSTEM FOR UTILITY VEHICLE

(71) Applicant: THE TORO COMPANY, Bloomington, MN (US)

(72) Inventors: Jerrod Neal Winter, Faribault, MN (US); Alan Joseph Kummet, Champlin, MN (US)

(73) Assignee: THE TORO COMPANY, Bloomington, MN (US)

( * ) Notice: Subject to any disclaimer, the term of this patent is extended or adjusted under 35 U.S.C. 154(b) by 242 days.

(21) Appl. No.: 17/751,859

(22) Filed: May 24, 2022

(65) Prior Publication Data
US 2022/0379947 A1    Dec. 1, 2022

Related U.S. Application Data

(60) Provisional application No. 63/193,176, filed on May 26, 2021.

(51) Int. Cl.
| | |
|---|---|
| *B62D 1/12* | (2006.01) |
| *A01D 69/03* | (2006.01) |
| *B62D 11/00* | (2006.01) |
| *B62D 11/04* | (2006.01) |
| *A01D 34/64* | (2006.01) |

(52) U.S. Cl.
CPC .............. *B62D 1/12* (2013.01); *A01D 69/03* (2013.01); *B62D 11/006* (2013.01); *B62D 11/04* (2013.01); *A01D 34/64* (2013.01)

(58) Field of Classification Search
CPC .............. B62D 1/12; B62D 1/00; B62D 1/02; B62D 11/006; B62D 11/005; B62D 11/04; A01D 69/03; A01D 34/64
See application file for complete search history.

(56) References Cited

U.S. PATENT DOCUMENTS

| | | | |
|---|---|---|---|
| 4,558,558 A | 12/1985 | Horner, Jr. et al. | |
| 5,020,308 A * | 6/1991 | Braun | B62D 51/002 56/11.5 |
| 5,131,483 A | 7/1992 | Parkes | |
| 5,511,367 A | 4/1996 | Powers et al. | |
| 5,644,903 A * | 7/1997 | Davis, Jr. | B62D 11/183 56/10.8 |
| 5,822,961 A | 10/1998 | Busboom | |

(Continued)

OTHER PUBLICATIONS

Toro, "Sand Pro Series: Infield Groomer/Bunker Rake," Product Catalog, The Toro Company, 2019, 8 pages.
U.S. Appl. No. 63/193,176, filed May 26, 2021.

*Primary Examiner* — Frank B Vanaman
(74) *Attorney, Agent, or Firm* — Mueting Raasch Group

(57) ABSTRACT

A drive control system and a utility vehicle incorporating the drive control system. The drive control system may include first and second drive control levers each adapted to independently control an output of an associated drive member. A coupler is interposed between the drive control levers and is configured to provide a synchronizing force. The synchronizing force may cause movement of one drive control lever to produce corresponding movement of the other drive control lever, thereby allowing straight-line vehicle travel via operator input to a single drive control lever. The synchronizing force may be overcome by application of independent forces to each of the two drive control levers.

12 Claims, 12 Drawing Sheets

(56) References Cited

U.S. PATENT DOCUMENTS

| | | | |
|---|---|---|---|
| 5,848,520 | A | 12/1998 | Arfstrom et al. |
| 6,098,385 | A | 8/2000 | Turk |
| 6,105,348 | A | 8/2000 | Turk et al. |
| 6,155,033 | A | 12/2000 | Wians et al. |
| 6,301,864 | B1 * | 10/2001 | Damie ............... A01D 34/6812 |
| | | | 56/11.3 |
| 6,640,526 | B2 | 11/2003 | Velke et al. |
| 6,688,090 | B2 | 2/2004 | Velke et al. |
| 6,729,115 | B2 | 5/2004 | Bartel |
| 6,782,964 | B1 | 8/2004 | Korthals et al. |
| 7,213,662 | B2 | 5/2007 | Crumly |
| 7,647,754 | B2 | 1/2010 | Velke et al. |
| 8,047,310 | B2 | 11/2011 | Kallevig |
| 8,096,374 | B1 | 1/2012 | Papke et al. |
| 8,783,391 | B2 | 7/2014 | Porter et al. |
| 9,970,176 | B2 | 5/2018 | Azure et al. |
| 10,150,502 | B2 | 12/2018 | Kallevig et al. |
| 2008/0035394 | A1 | 2/2008 | Bartel |
| 2008/0178568 | A1 * | 7/2008 | Edlin .................... A01D 34/64 |
| | | | 56/10.8 |
| 2013/0175105 | A1 * | 7/2013 | Gallazzini ............. B60K 17/28 |
| | | | 180/170 |
| 2019/0141889 | A1 * | 5/2019 | Fisher .................... B60K 17/28 |
| | | | 56/10.7 |
| 2019/0225264 | A1 * | 7/2019 | Gallazzini ............. B62D 51/06 |
| 2019/0239431 | A1 * | 8/2019 | Kastelic, Jr. ......... B62D 11/006 |
| 2019/0291779 | A1 * | 9/2019 | Zeiler .................... B60K 1/02 |
| 2022/0377961 | A1 | 12/2022 | Winter et al. |

* cited by examiner

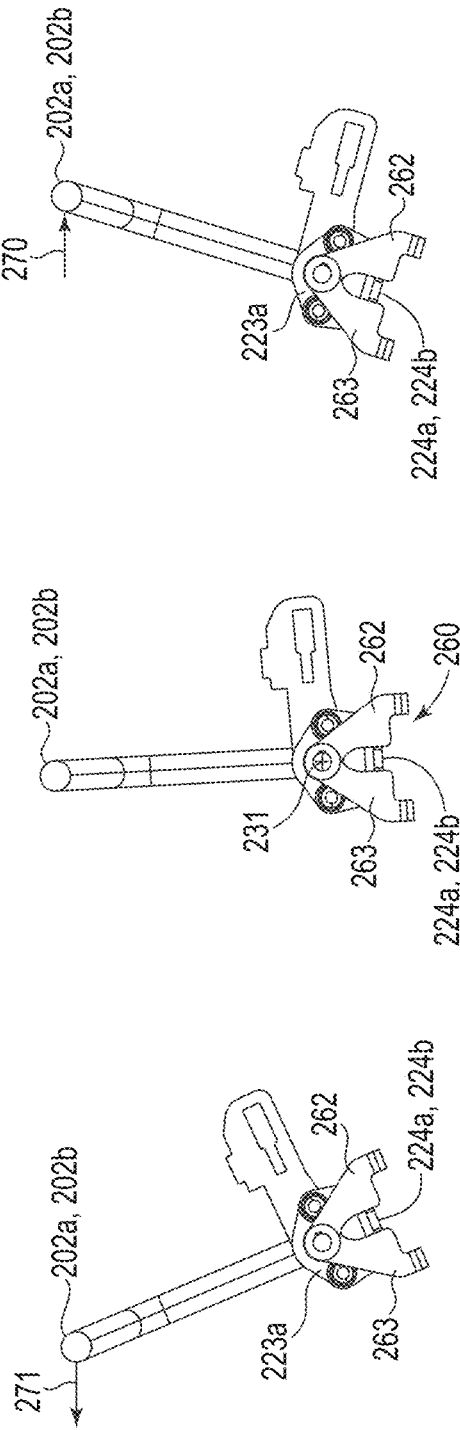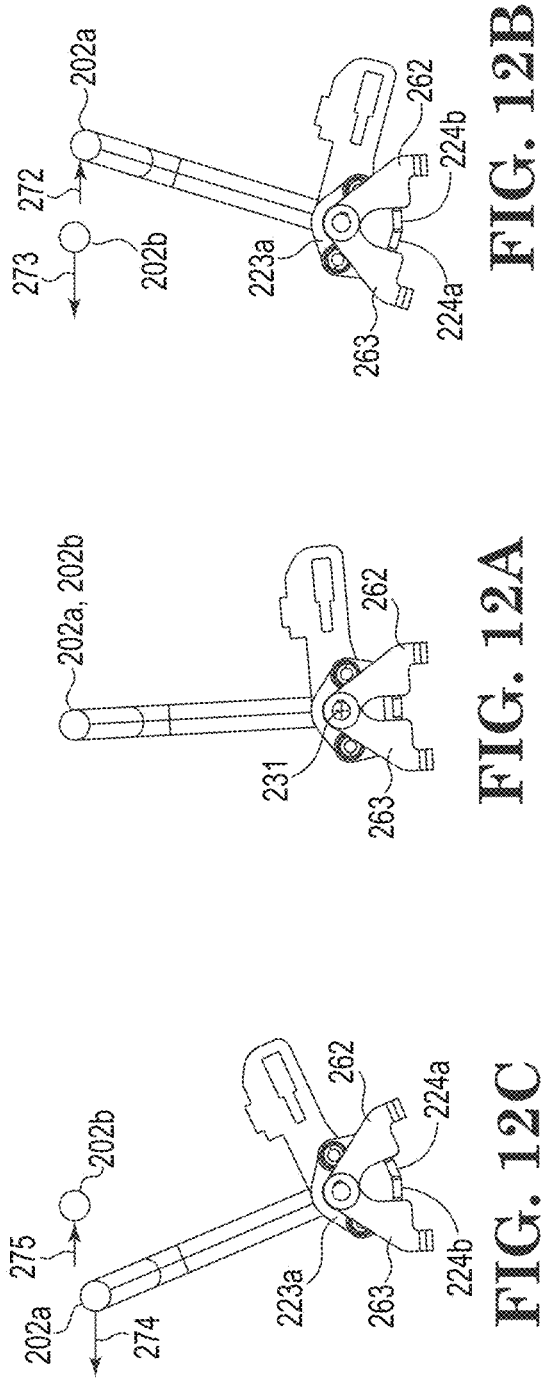

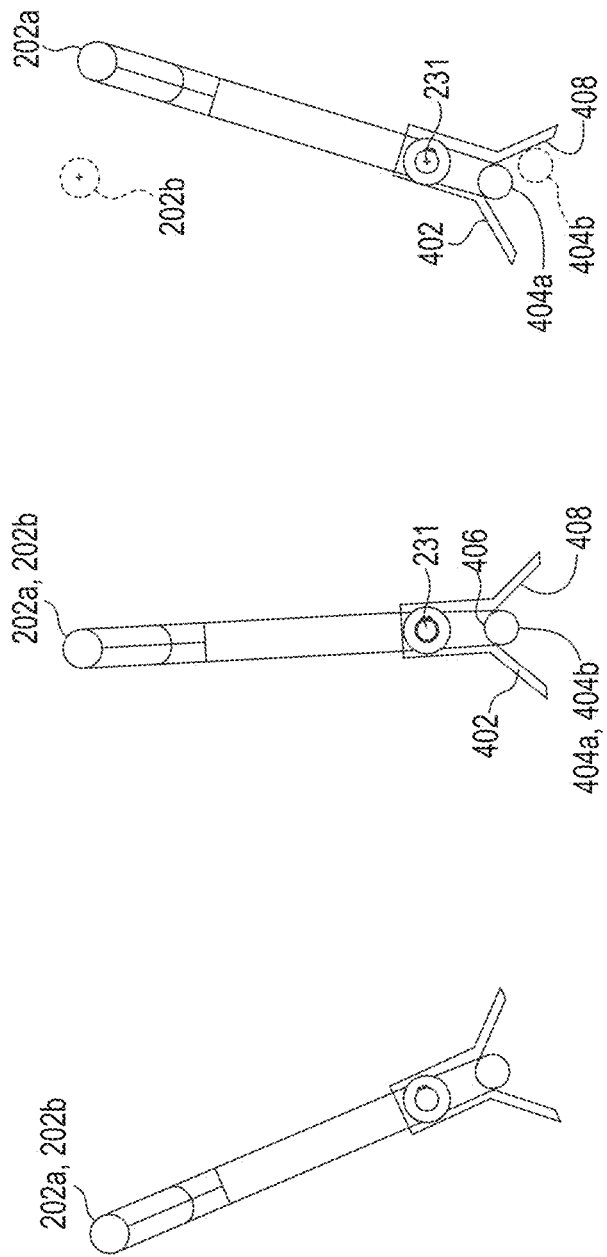

DRIVE CONTROL SYSTEM FOR UTILITY VEHICLE

The present application claims priority to and/or the benefit of U.S. Provisional Patent Application No. 63/193,176, filed 26 May 2021, which is incorporated herein by reference in its entirety.

Embodiments of the present disclosure relate generally to a vehicle such as a grounds care or other utility vehicle and, more specifically, to a drive control system for controlling the speed and direction of the vehicle.

BACKGROUND

Lever or "stick" control systems are used as propulsion control inputs in a wide variety of vehicles. For example, utility vehicles may include a "twin-stick" control system to independently control a speed and rotational direction of two or more drive wheels. Such vehicles may be configured as either walk-behind or ride-on (stand-on or sit-on) units. By independently controlling a drive wheel on each side of the vehicle, the vehicle may execute small-radius turns or even, in some instances, zero-radius turns.

Utility vehicles controlled by such twin-stick control systems generally includes a prime mover (e.g., internal combustion engine or electric motor) coupled to a continuously variable drive system. For example, the vehicle may include left and right hydraulic motors coupled to left and right drive wheels, respectively. Power may be transmitted from the prime mover to the left and right hydraulic motors, e.g., via one or more pumps, to drive the left and right drive wheels independently. The rotational speed and direction of each drive wheel may then be proportionally controlled by the associated control stick under the control of an operator.

To drive the vehicle in a straight line, the operator may move both control sticks in unison. Should the operator need to interact with another vehicle control, however, release of one stick will typically cause that stick to return to its neutral position and, accordingly, cause the associated drive wheel to slow or stop, resulting in a potentially unwanted turn.

SUMMARY

Embodiments described herein may provide a utility vehicle including: a chassis; first and second drive members attached to the chassis and supporting the chassis upon a ground surface; first and second transmissions attached to the chassis, the first and second transmissions operatively coupled to the first and second drive members, respectively; and independent first and second drive control levers movably attached to the chassis. The first and second drive control levers may be operatively connected to the first and second transmissions, respectively, wherein each drive control lever is configured to move between a neutral position corresponding to zero velocity of its respective drive member, and a first position corresponding to a forward velocity of its respective drive member. A coupler is also provided and interposed between the first and second drive control levers, wherein the coupler incudes a biasing element configured to provide a synchronizing force between the first and second drive control levers. Upon application of a first force to the first drive control lever that results in movement of the first drive control lever to a position between the neutral position and the first position, the coupler causes movement of the second drive control lever to a corresponding position. Moreover, upon application of a second force to the second drive control lever that is in a direction opposite that of the first force, and in which a sum of the first and second forces exceeds the synchronizing force, the coupler causes the second drive control lever to move to a different position that lacks correspondence with a position of the first drive control lever.

In another embodiment, a utility vehicle is provided that includes: a chassis; first and second drive members attached to the chassis and supporting the chassis upon a ground surface; first and second transmissions attached to the chassis, the first and second transmissions operatively coupled to the first and second drive members, respectively; and independent first and second drive control levers attached to the chassis and pivotable about a pivot axis. The first and second drive control levers are operatively connected to the first and second transmissions, respectively, wherein each drive control lever is configured to move between a default position corresponding to a default velocity of its respective drive member, and a first position corresponding to a first velocity of its respective drive member, wherein both of the drive control levers are biased to their default positions. A coupler is also provided and interposed between the first and second drive control levers, wherein the coupler includes a biasing element configured to provide a synchronizing force between the first and second drive control levers. Upon application of a first force to the first drive control lever that results in movement of the first drive control lever to a position between the default position and the first position, the coupler causes movement of the second drive control lever to a corresponding position. Moreover, upon application of a second force to the second drive control lever that is in a direction opposite that of the first force, and in which a sum of the first and second forces exceeds the synchronizing force, the coupler causes the second drive control lever to move to a different position that lacks correspondence with a position of the first drive control lever.

In yet another embodiment, a method for controlling a speed and direction of a utility vehicle is provided, wherein the method includes controlling a speed and direction of a first drive member via movement of a first drive control lever between a neutral position corresponding to zero velocity of the first drive member, and a first position corresponding to a forward velocity of the first drive member, wherein the first drive control lever is biased to the neutral position. The method further includes controlling a speed and direction of a second drive member via movement of a second drive control lever between a neutral position corresponding to zero velocity of the second drive member, and a first position corresponding to a forward velocity of the second drive member, wherein the second drive control lever is also biased to the neutral position. The method includes: applying a first force to displace the first drive control lever from its neutral position to an operating position between the neutral position and the first position; and providing a synchronizing force between the first drive control lever and the second drive control lever such that the second drive control lever moves in unison with the first drive control lever without application of a force to the second drive control lever.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein:

FIGS. 11A-11C are diagrammatic views of a drive control system incorporating the exemplary coupler of FIG. 10, wherein: FIG. 11A shows two drive control levers in a neutral position; FIG. 11B shows both drive control levers in corresponding forward propulsion positions (for straight line travel); and FIG. 11C shows both drive control levers in corresponding reverse propulsion positions;

FIGS. 12A-12C are diagrammatic views of the drive control system incorporating the exemplary coupler of FIG. 10, wherein: FIG. 12A shows both drive control levers in a neutral position; FIG. 12B shows the drive control levers during a turn in a first direction; and FIG. 12C shows the drive control levers during a turn in a second direction opposite the first direction; and FIGS. 13A-13C are diagrammatic views of a drive control system incorporating a coupler in accordance with another embodiment of the present disclosure, wherein: FIG. 13A shows both drive control levers in a neutral position; FIG. 13B shows the drive control levers during a turn in a first direction; and FIG. 13C shows both drive control levers in corresponding reverse propulsion positions.

Figure 1:
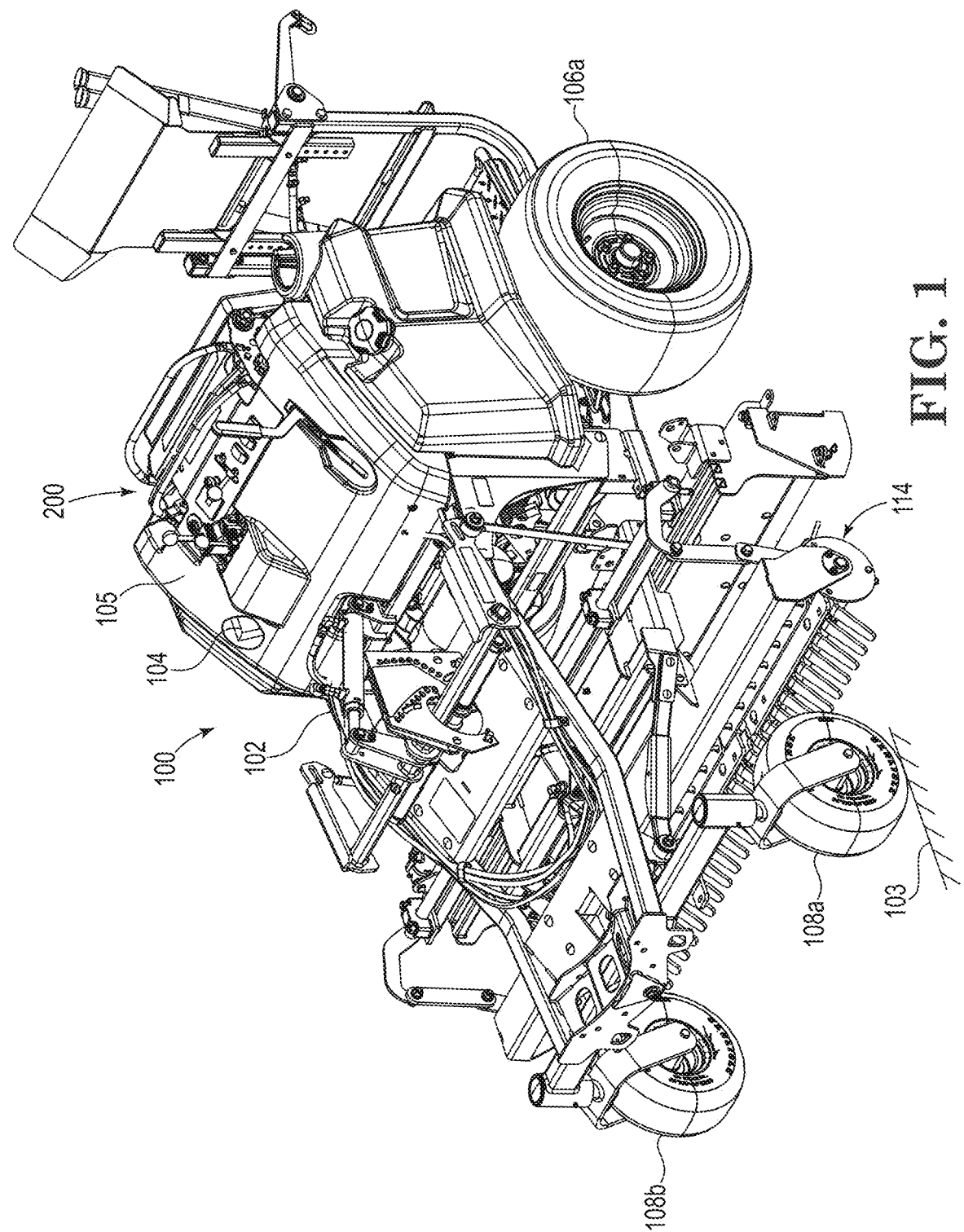
FIG. 1 is a left front perspective view of a utility vehicle (e.g., sports field groomer) in accordance with embodiments of the present disclosure.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may not be described and/or illustrated herein, are certainly contemplated.

All headings provided are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about." The term "and/or" (if used) means one or all of the listed elements or a combination of any two or more of the listed elements. The term "i.e." is used as an abbreviation for the Latin phrase id est and means "that is." The term "e.g." is used as an abbreviation for the Latin phrase exempli gratia and means "for example."

Illustrative embodiments are shown in the context of a self-propelled vehicle incorporating a prime mover (e.g., one or more internal combustion engines or electric motors). The vehicle may include a chassis and first and second drive members attached to the chassis, the drive members supporting the chassis upon a ground surface. First and second transmissions may be attached to the chassis, wherein the first and second transmissions are operatively coupled to the first and second drive members, respectively. The vehicle may further include independent first and second drive control levers movably attached to the chassis. The first and second drive control levers may be operatively connected to the first and second transmissions, respectively. Each control lever is configured to move between a neutral position corresponding to zero velocity (or, as further described herein, a default position corresponding to a default velocity) of its respective drive member, and a first position corresponding to a forward velocity of its respective drive member, and optionally a second position corresponding to a reverse velocity of its respective drive member. A coupler is interposed between the first and second drive control levers. The coupler includes a biasing element configured to provide a synchronizing force between the first and second drive control levers whereby the coupler: upon application of a first force to the first drive control lever that results in movement of the first drive control lever to a position between the neutral (or default) position and the first position (or at the first position), causes movement of the second drive control lever to a corresponding position; and upon application of a second force to the second drive control lever that is in a direction opposite to the first force, and in which a sum of the first and second forces exceeds the synchronizing force, causes the second drive control lever to move to a different position that lacks correspondence with a position of the first drive control lever.

As used herein, "correspondence" of positions of the two drive control levers refers to the two levers being in generally equivalent positions such that the outputs of each transmission/drive member are equal to one another such that straight line travel of the vehicle occurs. Similarly, when one of the drive control levers is described herein as lacking correspondence with the other, the two levers are in distinct positions such that the vehicle is changing heading (e.g., turning).

FIG. 1 illustrates portions of a drive control system 200 in accordance with embodiments of this disclosure, the system shown as part of a self-propelled utility vehicle 100. For illustrative purposes, the vehicle is described and illustrated herein as a ground care vehicle (e.g., sports field groomer). However, those of skill in the art will realize that drive control systems in accordance with embodiments of the present disclosure may find application to any utility vehicle. As used herein, the term "utility vehicle" may include most any walk-behind, ride-behind (e.g., such as vehicles utilizing sulkies), and ride-on (sit-on and stand-on) ground-working (including ground-grooming) vehicles including mowers, skid-steer loaders, aerators, snow throwers, tillers, trenchers, horizontal directional drills, dozers, compact utility loaders, agricultural tractors/vehicles, demolition and construction vehicles, all-terrain and other recreational vehicles, etc. In fact, drive control systems like those described and/or illustrated herein may find application to most any machine that utilizes at least two independent drive control inputs each of which independently controls a corresponding output (e.g., left and right drive control levers controlling, respectively, left and right transmissions/drive wheels). Embodiments of the present disclosure may further find application to autonomous or remotely-controlled vehicles.

It is noted that the terms "have," "include," "comprise," and variations thereof, do not have a limiting meaning, and are used in their open-ended sense to generally mean "including, but not limited to," where the terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective shown in the particular figure, or while the vehicle 100 is in an operating configuration (e.g., while the vehicle 100 is positioned such that wheels 106 and 108 rest upon a generally horizontal ground surface 103 as shown in FIG. 1). These terms are used only to simplify the description, however, and not to limit the interpretation of any embodiment described.

Still further, the suffixes "a" and "b" may be used throughout this description to denote various left- and right-side parts/features, respectively. However, in most pertinent respects, the parts/features denoted with "a" and "b" suffixes are substantially identical to, or mirror images of, one another. It is understood that, unless otherwise noted, the description of an individual part/feature (e.g., part/feature identified with an "a" suffix) also applies to the opposing part/feature (e.g., part/feature identified with a "b" suffix). Similarly, the description of a part/feature identified with no suffix may apply, unless noted otherwise, to both the corresponding left and right part/feature.

A brief description of the exemplary vehicle 100 is provided below with reference to FIGS. 1-5. While the vehicle is described in some detail, such description is exemplary only as other vehicle configurations are certainly contemplated.

Figure 2:
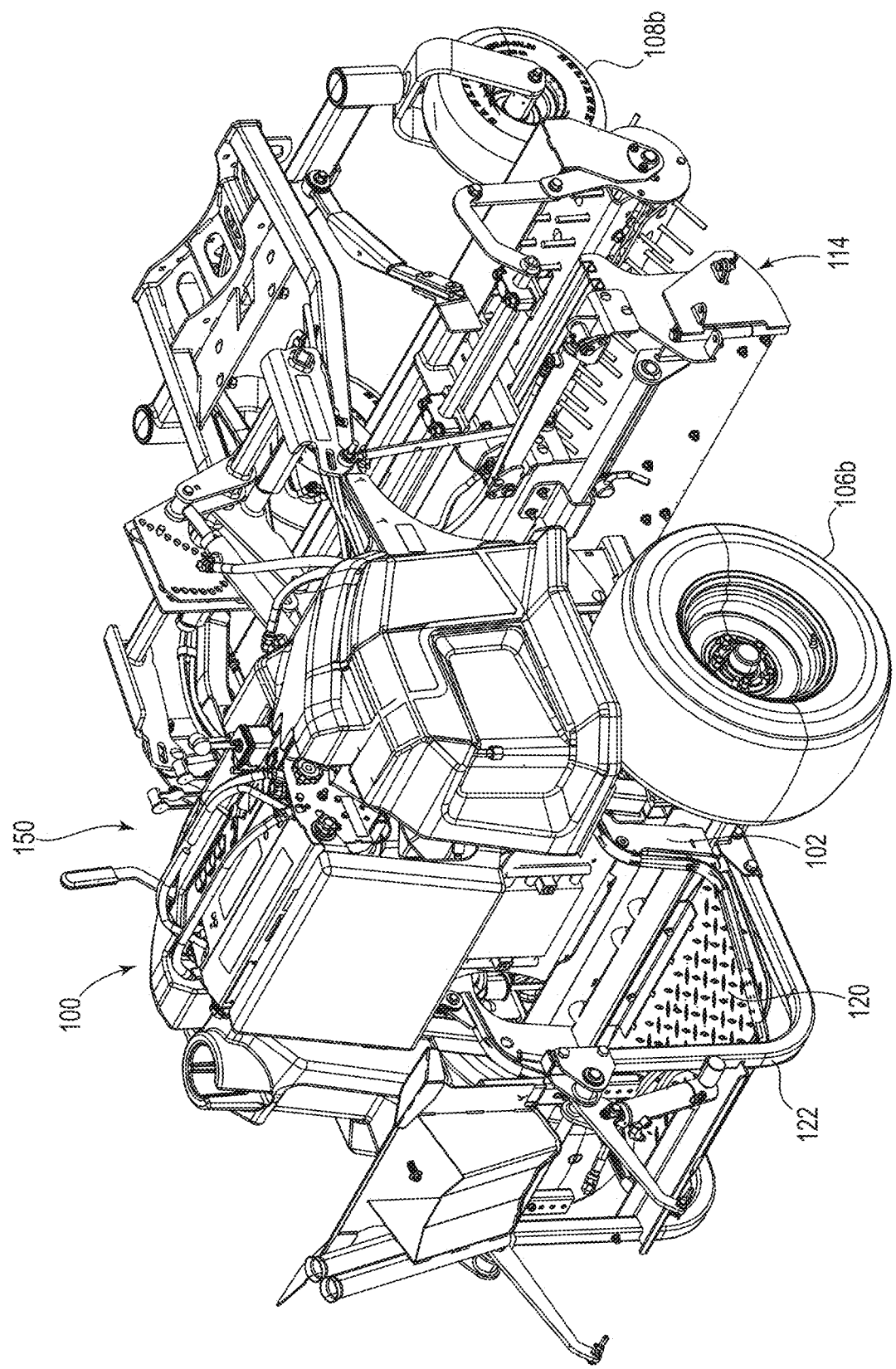
FIG. 2 is a right rear perspective view of the vehicle of FIG. 1.

As shown in FIGS. 1-2, the vehicle 100 may include a chassis 102 supporting a prime mover, e.g., internal combustion engine 104 (obscured by an engine cover 105 in FIG. 1) or, alternatively, one or more electric motors. First and second ground-engaging drive members (e.g., first and second drive wheels 106 (106a and 106b)) may be coupled for rotation, respectively, to opposite (e.g., first (left) and second (right)) sides of the chassis to support the vehicle upon, and propel the vehicle 100 relative to, the ground surface 103. One or more support wheels 108 (e.g., caster wheels 108a, 108b) may also be provided to further support the vehicle upon the ground surface 103. As used herein, the term "wheels" is understood to include not only conventional pneumatic tire-and-wheel combinations, but also tireless wheels (e.g., where the wheel is designed to directly engage the ground surface), and "airless" tires such as those sold under the tradename "Tweel" (sold by Michelin of Clermont-Ferrand, France) and "Tractus" (sold by Exmark Manufacturing Co., Inc. of Beatrice, Nebr., USA).

While shown having the drive wheels 106 at or near a rear end of the chassis and the caster wheels 108 near a front end, such a configuration is not limiting. For example, other embodiments may reverse the location of the wheels, e.g., drive wheels in front and driven or undriven wheels in back, while other configurations may utilize an all-wheel-drive arrangement. Still further, some configurations may use different wheel configurations altogether, e.g., a tri-wheel configuration or a vehicle using conventionally-steered (e.g., Ackermann-type) front wheels. Moreover, other embodiments may substitute, for any one or more of the wheels, other drive members such as tracks, rollers, and the like without departing from the scope of this disclosure.

A ground-working tool 114 may be mounted to a lower side of the chassis 102 generally between the drive wheels 106 and the caster wheels 108 as shown in FIG. 1. In the illustrated example, the tool 114 may include one or more operator-selectable grooming tools such as one or more tines, rakes, etc. suitable for interacting with the ground surface 103. While shown as having fixed elements, the tool 114 could optionally be powered by the engine 104. For instance, the ground-working tool could instead be, or otherwise include, a rotating or reciprocating core aerator, a mower cutting deck, a debris blower, a debris vacuum, or most any other ground-working (including ground-grooming) tool.

As shown in FIG. 2, the exemplary vehicle 100 may further include, at the rear end of the vehicle, a standing platform 120 as well as, in some embodiments, an optional detachable frame 122, the latter mounted to the chassis 102 and extending aft of the platform. The frame 122 may support a drag mat or other ground-working tool (not shown) to be used separately from, or in conjunction with, the tool 114. The platform 120 may be moved between a deployed position as shown in FIG. 2, and a stowed position (not shown, but folded against the vehicle 100 similar to that shown in, e.g., FIG. 2 of U.S. Pat. No. 8,047,310). In the deployed position, an operator may stand upon the platform during vehicle operation. Alternatively, the platform 120 may be moved to the stowed position to accommodate the operator in a walk-behind configuration (assuming that the frame 122 is removed).

Figure 3:
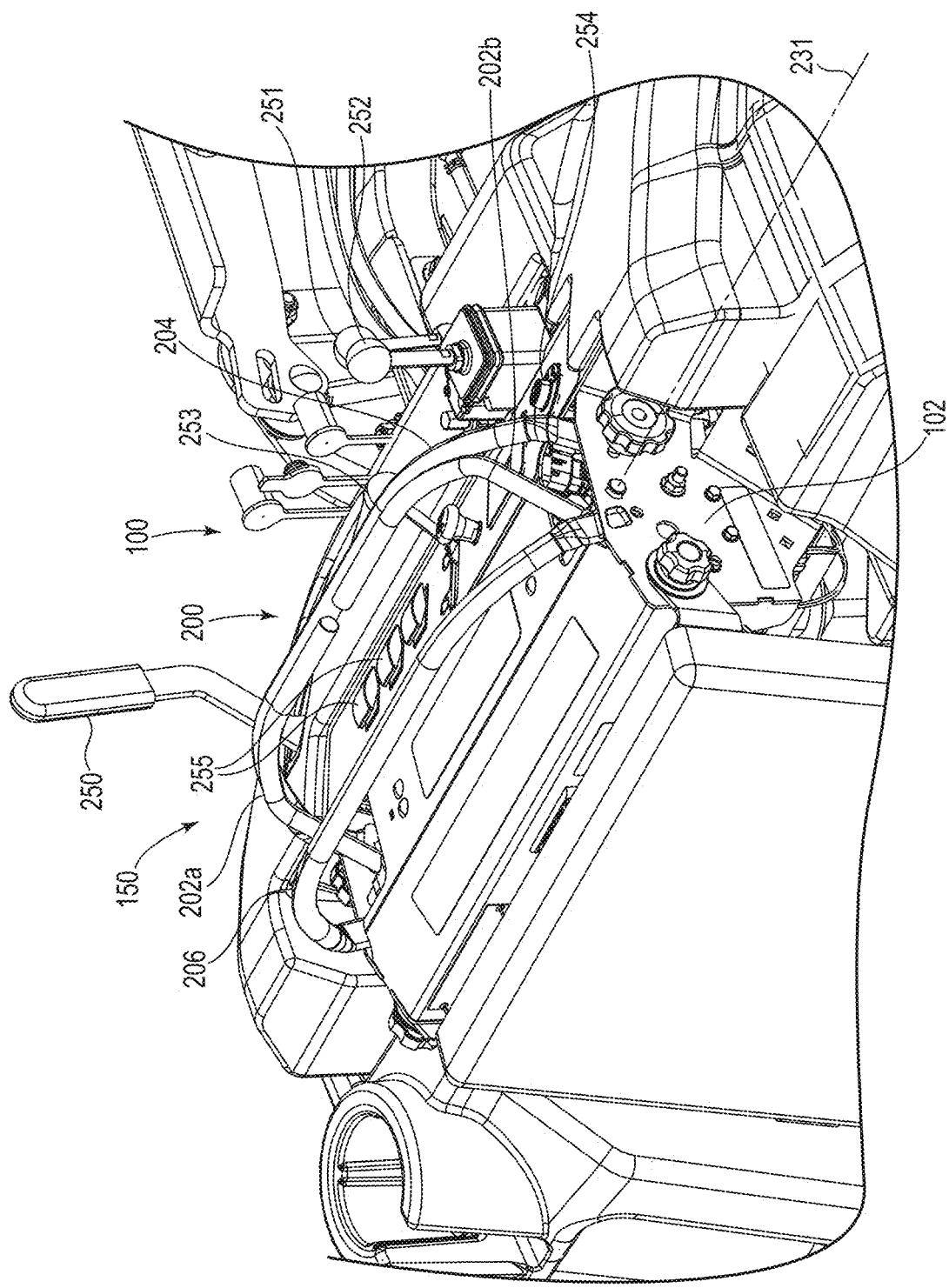
FIG. 3 is an enlarged perspective view of a control area of the utility vehicle of FIG. 1.

As further shown in FIG. 2, the vehicle 100 may include a control area 150 of which FIG. 3 is an enlarged view thereof. The control area 150 may include various operator controls located on upwardly extending portions of the chassis 102 near the rear end of the vehicle such that the controls associated with the control area are within comfortable reach of an operator standing either behind the vehicle or upon the platform 120. Controls may include, for example, a parking brake lever 250, hydraulic control valve joysticks 251, 252, engine speed control 253, engine ignition 254, and other switches 255 associated with vehicle operation.

As shown in FIG. 3, the drive control system 200 may include, among other elements, an independent first input (e.g., first or left drive control lever 202a) and an independent second input (e.g., second or right drive control lever 202b). The drive control levers 202 may also be referred to herein individually (collectively) as "lever(s)" or "control lever(s)." Dual lever drive control lever systems are sometimes referred to as "twin-stick" systems.

The drive control levers 202 may be movably (e.g., pivotally) attached to the chassis. For instance, they may be configured to pivot about an axis (e.g., a transverse, horizontal pivot axis 231) between an optional first or forward stop 204, and an optional second or rearward stop 206 (levers 202 are shown against the forward stop 204 in FIGS. 1-3). In some embodiments, the stops 204, 206 may be fixed relative to the chassis 102 while, in other embodiments, one or both stops 204 and 206 may be adjustable (e.g., pivotable) to allow operator-selection of drive control lever movement range. While shown as pivotally attached, the drive control levers 202 could alternatively be attached to the chassis 102 such that the levers translate relative to the chassis.

While not illustrated, one or both of the drive control levers 202 could include a switch (e.g., pressure switch or capacitive touch switch) that functions as an operator presence control. As is recognized in the art, activation of an operator presence control (indicating the operator is present) may be required before engaging some of the vehicle systems/subsystems (e.g., engine, propulsion system, tool control, etc.).

Figure 4:
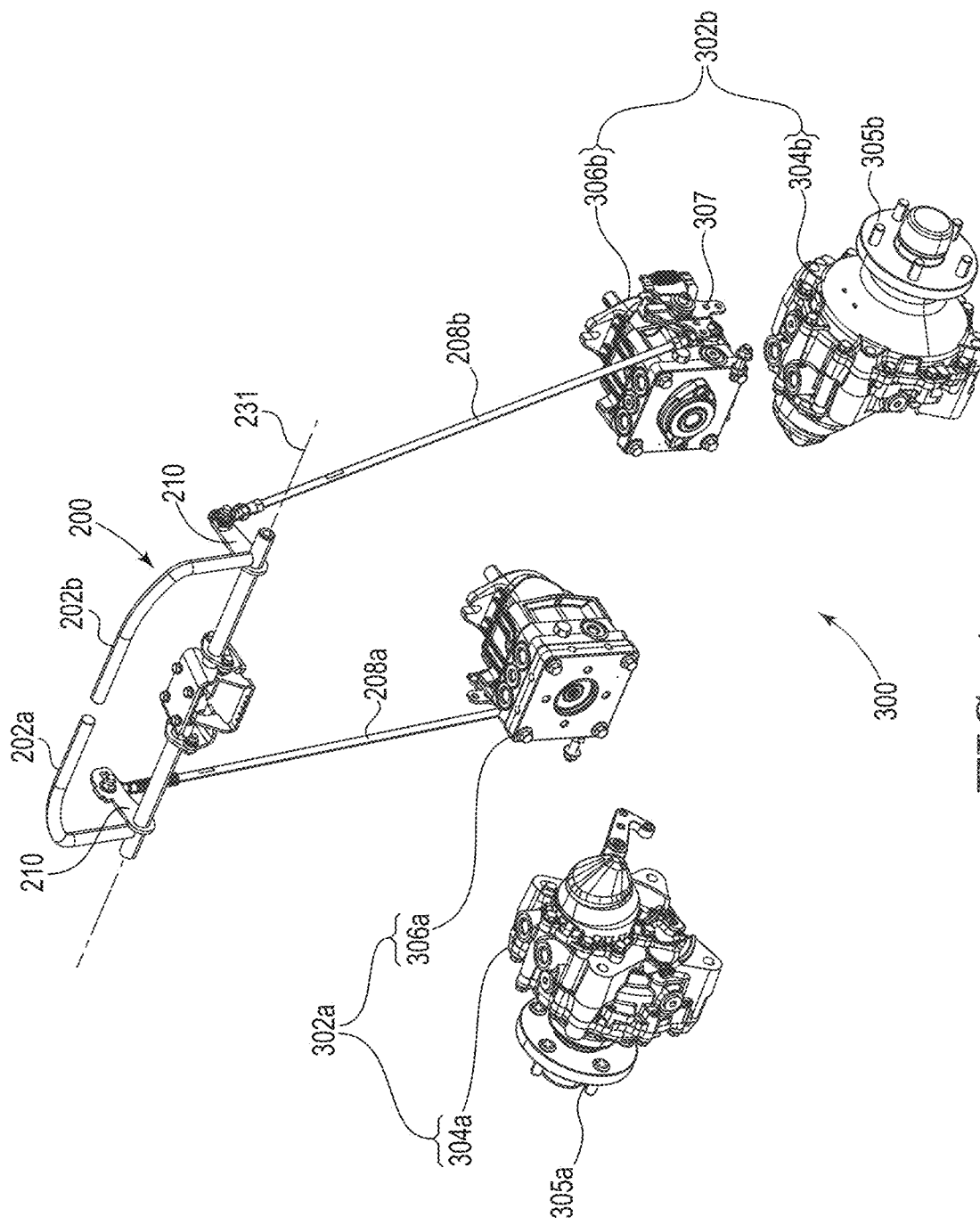
FIG. 4 is an isolated view of a drive control system and propulsion system in accordance with embodiments of the present disclosure.

FIG. 4 is an isolated view of portions of the drive control system 200 and an associated propulsion system 300 in accordance with embodiments of the present disclosure. As shown in this view, the exemplary drive control system 200 may include tie rods 208 (e.g., left tie rod 208a and right tie rod 208b) that operatively connect each drive control lever 202 to an associated transmission 302 (transmission 302a or 302b) of the propulsion system 300 as further described below. Each transmission may convert movement of its associated drive control lever to a proportional output of the transmission that, in turn, produces proportional output of the connected drive wheel 106 (see FIG. 1).

The drive control lever(s) 202 are shown in a first or maximum forward position (e.g., abutting the stop 204) in FIGS. 1-3, corresponding to a maximum forward speed/output of the associated transmission 302 and drive wheel 106. However, both drive control levers 202 may be biased toward a neutral position between the stops 204 and 206. The neutral position may correspond to zero output/velocity of the lever's associated transmission 302/drive wheel. Each drive control lever 202 may further be pivotable rearwardly to a second or maximum rearward position (e.g., abutting the stop 206) corresponding to a maximum reverse output/velocity of the associated transmission 302 and drive wheel 106. In some embodiments, the neutral position of each drive control lever 202 may be located more closely to the rearward stop 206 to provide a greater range of lever movement during forward propulsion.

As stated above, each drive control lever 202 may independently vary a speed, via its associated transmission 302, of its respective drive wheel 106 proportionally between zero (when in the neutral position) and a maximum forward speed (when in the maximum forward position). Each drive control lever 202 may additionally vary proportionally a reverse speed of its associated drive wheel 106 by moving from the neutral position toward the maximum reverse position (abutting the stop 206), corresponding to the maximum reverse speed of its respective drive wheel 106.

While not wishing to be bound to a particular transmission configuration, each transmission 302 may, as shown in FIG. 4, include a hydraulic pump 306 (see, e.g., left pump 306a and right pump 306b) and a hydraulic motor 304 (see, e.g., left motor 304a and right motor 304b). Each hydraulic pump 306 may receive power, e.g., via a belt-driven sheave (not shown), from the engine 104. Accordingly, to provide the proportional relationship between a position of the drive control lever 202 and a rotational speed and direction of its associated drive wheel 106, each tie rod 208 may extend from an arm 210 of the control lever 202 to a swashplate arm 307 of the associated transmission 302. As the swashplate arm 307 pivots under control of the tie rod 208, the pump 306 may alter its hydraulic output to the associated motor 304 as is known in the art. Moreover, each motor 304 includes an output shaft 305 to which its respective wheel 106 is attached. As rotational direction and speed of each drive wheel is independently controlled in this manner, the vehicle 100 may be propelled in both forward and reverse directions (when both drive control levers 202 are moved in unison), as well as execute left and right turns (including small- or zero-radius turns) by differential positioning of the drive control levers.

Figure 5:
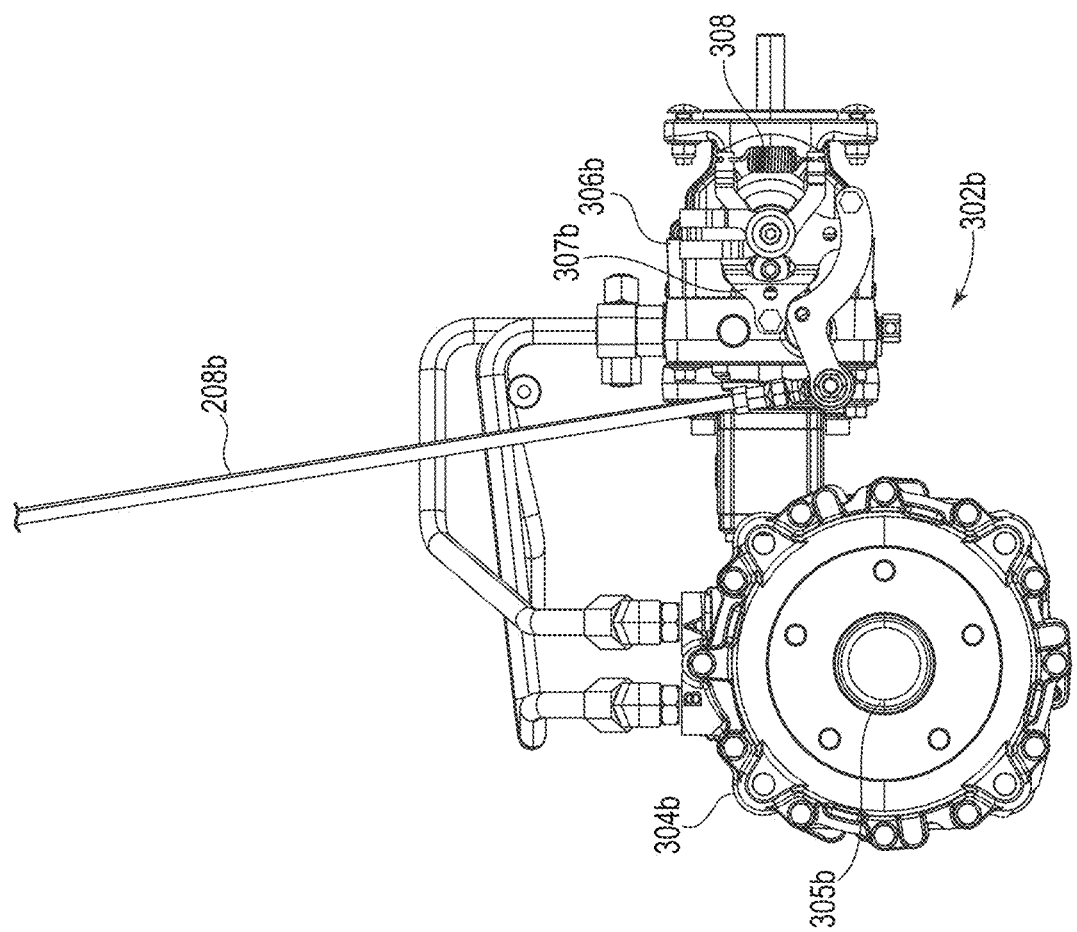
FIG. 5 is a partial side elevation view of the propulsion system of FIG. 4.

FIG. 5 is a partial side elevation view of the transmission 302b showing connection of the tie rod 208b with the swashplate arm 307b, as well as hydraulic connections between the hydraulic pump 306b and the hydraulic motor 304b. As shown in this view, each pump 306 may include a biasing member, e.g., return-to-neutral (RTN) spring 308. The spring 308 may bias the swashplate arm 307 to a neutral position corresponding to zero hydraulic output from the hydraulic pump 306. As the swashplate arm is connected to the drive control lever 202 via the tie rod 208, each drive control lever is similarly biased to its neutral position.

While shown as using hydraulic pumps and motors, transmissions in accordance with embodiments of the present disclosure may alternatively include one or more integrated hydrostatic transaxles to power the drive wheels. Other transmissions, e.g., mechanical gear- or pulley-driven systems, are also contemplated. Moreover, while shown using mechanically-operated transmissions, embodiments wherein the transmissions are electronically controlled (e.g., a "drive by wire" system) are also contemplated. Still further, each hydraulic pump and associated motor could be replaced by an electric motor without departing from the scope of this disclosure.

With conventional twin-stick drive control systems, the operator imparts forces to each of the drive control levers independently. These forces result in movement of the drive control levers from their respective neutral positions, producing proportional changes in speed (and direction) of the associated drive wheels. For example, to propel the vehicle forwardly in a straight line, the operator of a conventional twin-stick drive control system would apply generally equal forces to each of the left and right sticks, resulting in generally equivalent movement of the sticks from their neutral position to a desired position. As long as the sticks are held in corresponding (same equivalent) positions, the vehicle maintains straight-line travel.

While such operation is effective and intuitive, vehicle tracking may be dependent on separately maintaining both sticks in generally the same position relative to the neutral position. As a result, the operator may be unable to maintain, in some circumstances, straight-line travel when a hand is removed from one of the sticks to, for example, manipulate one of the other vehicle controls. In this instance, the vehicle may begin to turn, or the operator may be required to first slow or stop the vehicle to avoid unintended turns.

Drive control systems in accordance with embodiments of the present disclosure, however, may allow straight-line travel even when the force applied to one of the drive control levers 202 is relaxed or removed entirely. That is to say, drive control systems like those described herein may permit straight-line vehicle propulsion by applying a force to only one of the drive control levers, while still permitting conventional vehicle directional control by differential movement of the drive control levers.

Figure 6:
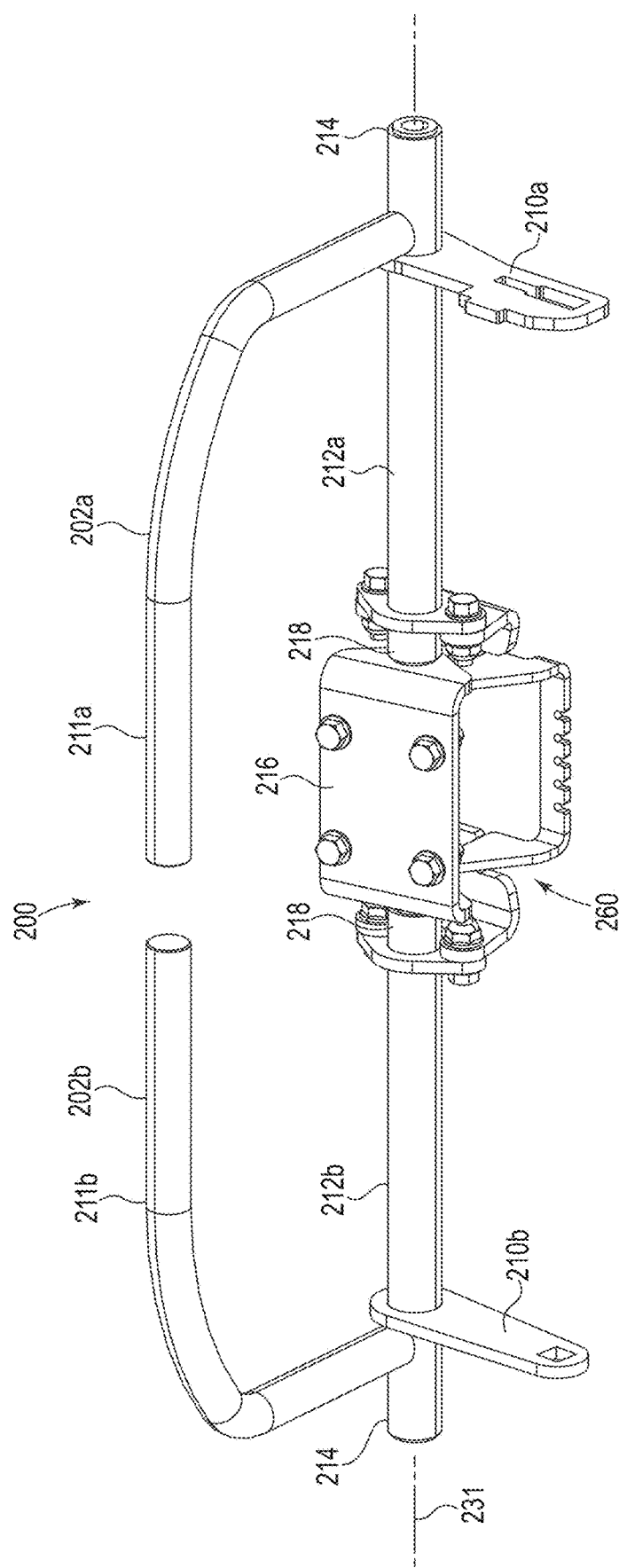
FIG. 6 is a partial perspective view of the drive control system of FIG. 4.

To provide this functionality, the exemplary drive control system 200 may be configured as shown in FIGS. 6-10. FIG. 6 shows the drive control levers 202 and various support structure. Such structure may support the drive control levers 202 for pivotal movement relative to the chassis 102 about the pivot axis 231. For example, bearings or bushings 209 (see FIG. 8) associated with the chassis may support a shaft portion 212 (e.g., 212a, 212b) of each drive control lever 202 at an outboard location 214, while a bracket 216 (mounted to the chassis 102) may rotationally support each shaft portion 212 at an inboard location 218. Each shaft portion 212 may be rigidly connected (e.g., welded) to a handle portion 211 as is also shown in FIG. 6.

Figure 7:
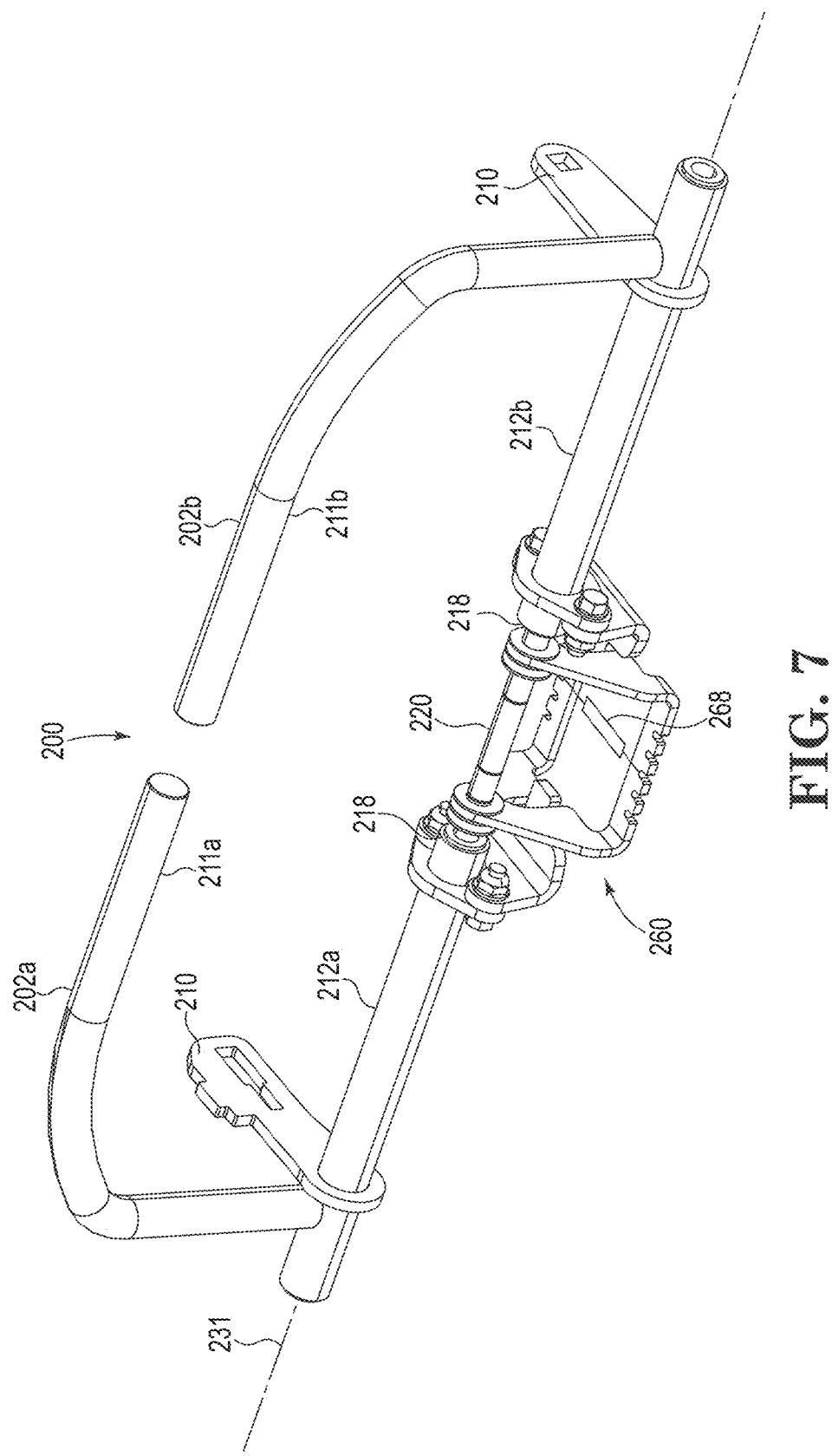
FIG. 7 is another partial perspective view like FIG. 6 with some structure removed.

FIG. 7 is a view taken opposite the perspective shown in FIG. 6 with the bracket 216 removed. As shown in this view, the bracket 216 may support an axle shaft 220 that, in turn, is configured to support each of the shaft portions 212 (via the bushings 209) as further described below.

Figure 8:
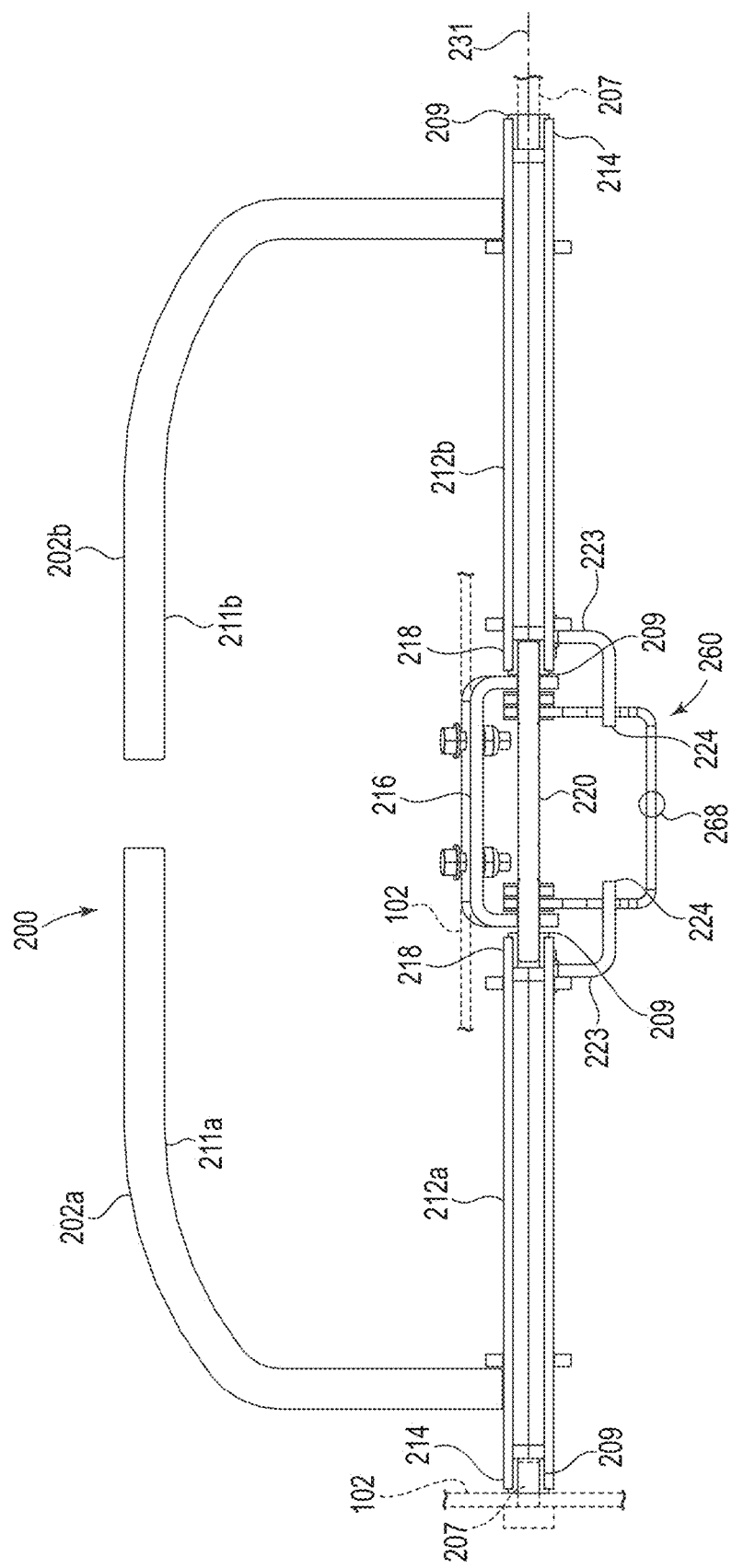
FIG. 8 is a cross sectional view of the drive control system of FIG. 6.

FIG. 8 is a cross section of the drive control system 200 of FIG. 6 taken through the axis 231. As indicated in this view, the shaft portions 212 of each drive control lever 202 may be tubular in shape such that a bushing 209 may be inserted from each end as shown. The bushings 209 near the inboard locations 218 may be configured to rotate about the axle shaft 220, while the bushings 209 near the outboard locations 214 may be configured to receive therein a stub shaft 207 extending inwardly from the chassis 102 (chassis illustrated on only left side in FIG. 8). As a result, the drive control levers are restrained from all movement except pivotal movement about the axis 231.

FIGS. 6-8 also illustrate a coupler 260 interposed or otherwise located between the drive control levers 202a, 202b. The coupler 260, as further described below, allows corresponding movement of the lever 202b when the operator applies a force to lever 202a (to cause both forward and reverse propulsion) and vice-versa.

Figure 9:
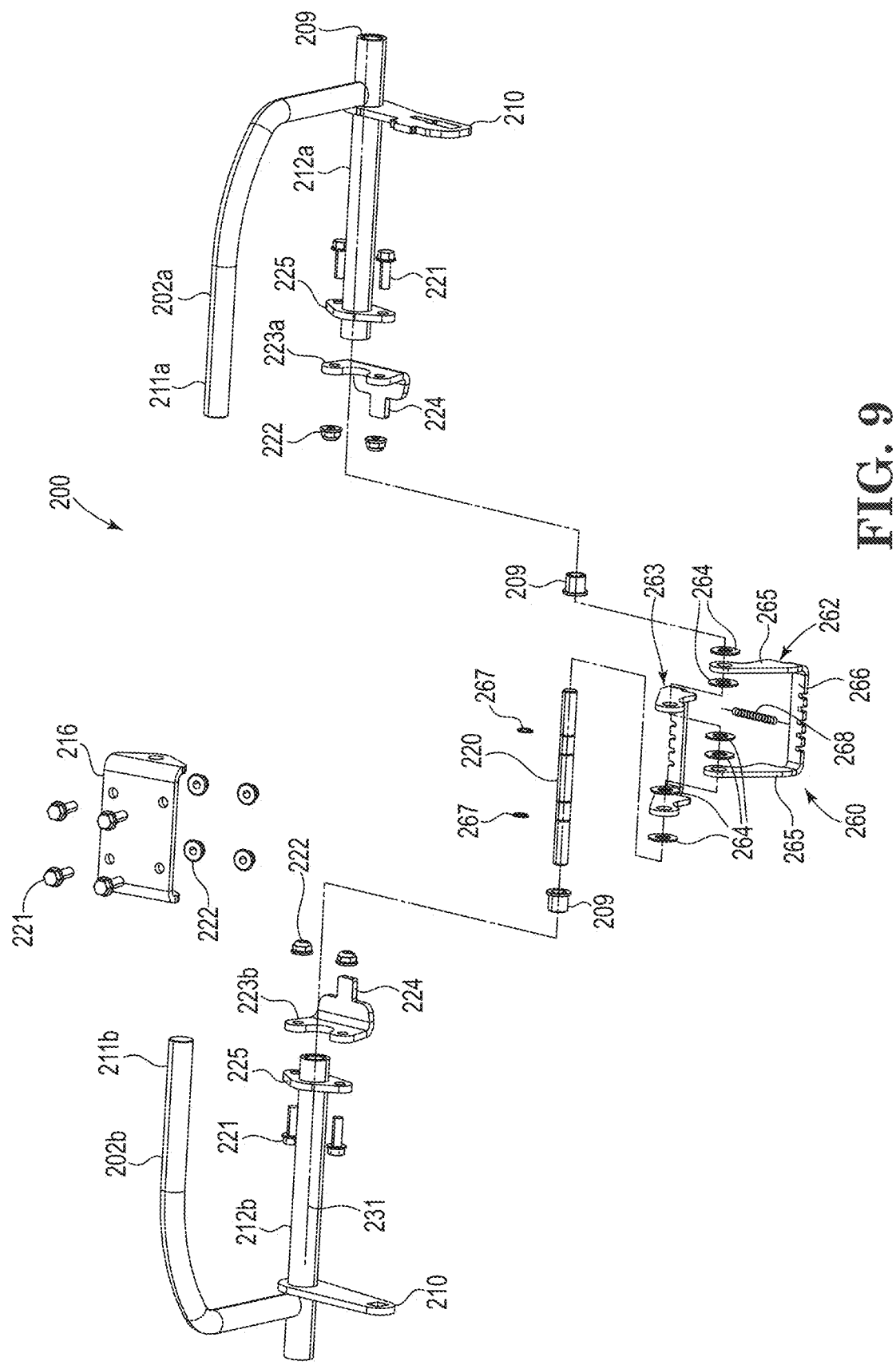
FIG. 9 is an exploded perspective view of the drive control system of FIG. 6.

FIG. 9 is an exploded perspective view of the drive control system 200. As shown in this view, the bracket 216 (not shown installed in FIG. 9) may be attached to the chassis 102 using fasteners (e.g., bolts 221 and nuts 222). Similarly, each drive control lever 202 may include an ear 223 (see e.g., first ear 223a and second ear 223b) having an inwardly-extending protrusion 224. In the illustrated embodiments, each ear 223 is secured to a flange 225 of its associated drive control lever 202 by fasteners (e.g., bolts 221 and nuts 222).

As further shown in FIG. 9, the coupler 260 may include first and second opposing jaws 262 and 263. Each jaw includes two radial arms 265 each having a proximal end (configured to pivotally mount to the axle shaft 220) and a distal end. The distal ends of the arms 265 of each jaw may be connected to one another via a body 266 such that each jaw 262 and 263 forms a generally U-shaped member. Washers 264 may be located between the arms 265 of each jaw 262, 263, as well as between the arms and the bushings 209. Moreover, washers 264 may be placed on the axle shaft 220 between the arms 265 and C-shaped retaining rings 267 (configured to engage circumferential grooves on the outer surface of the axle shaft 220).

The opposing jaws 262 and 263 are each adapted to pivot about the pivot axis 231 and are biased toward one another (about the axis 231) by one or more biasing elements, e.g., springs 268. In the illustrated embodiments, each spring 268 is configured as an extension spring connected to, and extending between, the body 266 of each jaw 262, 263. While shown as an extension spring, other embodiments could utilize other biasing members such as torsion springs or leaf springs without departing from the scope of this disclosure. As described below, the spring 268 may apply a biasing force between the jaws, thereby providing a synchronizing force between the drive control levers 202a 202b. While diagrammatically shown utilizing a single spring 268, the bodies 266 of each jaw may include provisions or other features (e.g., notches as shown) for accommodating multiple springs.

Figure 10:
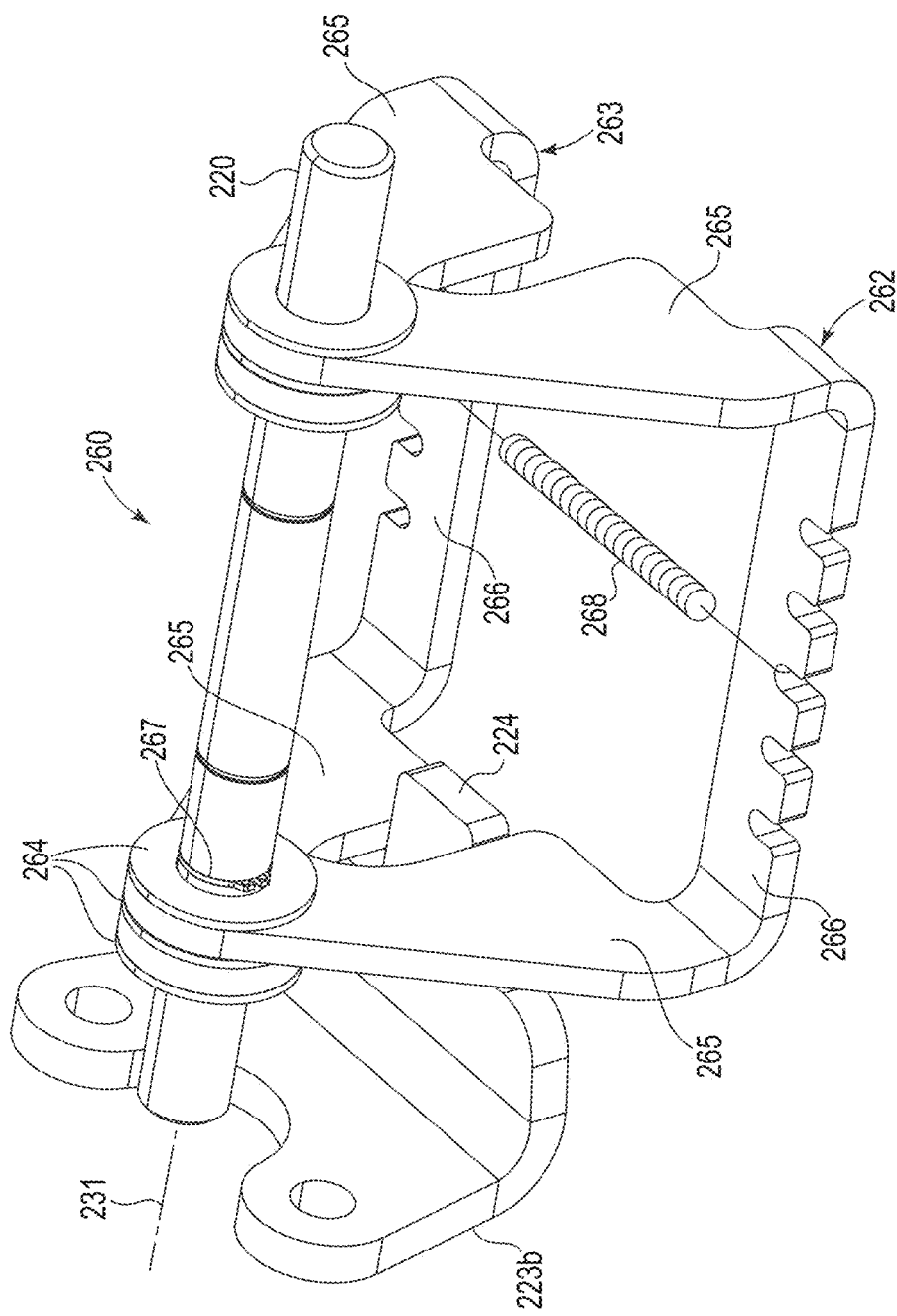
FIG. 10 is a partial, isolated view of a coupler in accordance with embodiments of the present disclosure.

FIG. 10 is a partial, enlarged view of the exemplary coupler 260 (the ear 223a removed from this view for clarity) showing the spring 268 biasing the opposing jaws 262, 263 toward one another (via pivotal movement about the axle shaft 220/axis 231) in a manner similar to a beartrap. The biasing force of the spring 268 causes each jaw to bear against the protrusion 224 of each ear 223. That is, the ears 223a, 223b are held captive between the two opposing jaws. Accordingly, the spring 268 provides a synchronizing force between the two drive control levers. As a result of this synchronizing force, movement of one drive control lever (e.g., pivoting of the lever 202b about the axis 231) results in corresponding movement of the associated ear (ear 223b). As the ear 223b is trapped between the two jaws 262, 263 as shown in FIG. 10, the two jaws move in unison with the drive control lever 202b. Moreover, because the ear 223a (see FIG. 9) is also trapped between the jaws, the jaws cause corresponding pivotal motion of the drive control lever 202a (assuming no external force is applied to the lever 202a that would overcome the force imparted by the coupler 260).

FIGS. 11A-11C and 12A-12C are diagrammatic section views that illustrate exemplary functionality of the coupler 260 during operation of the vehicle (each view being taken along the pivot axis 231). In FIGS. 11A and 12A, the drive control levers 202a, 202b are both shown in their respective neutral positions. When the operator applies a first or forward force 270 to the drive control lever 202a (e.g., a force that results in displacement or movement of the lever 202a to a position between the neutral position and the first position), the ear 223a/protrusion 224a moves in correspondingly fashion as indicated in FIG. 11B. Moreover, due to the synchronizing force resulting from the biased contact of the two jaws 262, 263 against the protrusion 224b, the coupler also causes movement of the lever 202b to a corresponding position. That is, the drive control lever 202b moves in unison/correspondence with the drive control lever 202a as shown (assuming that a threshold opposing force is not applied to the control lever 202b).

Similarly, upon application of a reverse force 271 (e.g., a force to move the lever 202a to a position resulting in reverse propulsion of the left drive wheel 106a), the ear 223a/protrusion 224a moves in correspondingly fashion as indicated in FIG. 11C. Again, in view of the synchronizing force resulting from the biased contact of the two jaws 262, 263 against the protrusion 224a, the drive control lever 202b (via interaction of the jaws 262, 263 with the protrusion 224b/ear 223b), again moves in unison with the drive control lever 202a as shown.

Thus, the operator may propel the vehicle in a straight line (in forward or reverse) by interacting with only one of the drive control levers. Note that while described herein as causing the lever 202b to move in correspondence with the lever 202a via application of a force to the lever 202a, the opposite is also true (i.e., the lever 202a can be moved in correspondence with the lever 202b by application of a force to the latter).

FIGS. 12A-12C illustrate coupler functionality during vehicle turning. Once again, FIG. 12A shows the drive control levers 202a, 202b in their respective neutral positions. If the operator wishes to execute a right turn, a first or forward force 272 may be applied to the lever 202a while a second or reverse force 273 (opposite, relative to the pivot axis 231, to the first force) may be applied to the lever 202b. When the sum of the first and second forces exceeds the synchronizing force (exceeds the biasing force of the spring 268), the second drive control lever 202b may move to a different position that lacks correspondence with the position of the first drive control lever. That is to say, when the applied forces 272 and 273 are sufficient to overcome the spring force/synchronizing force, the levers may be moved to/held at the relative differential positions shown in FIG. 12B. More specifically, when the forces 272 and 273 are applied as shown in FIG. 12B, the ears 223a and 223b may overcome the biasing force of the coupler 260, causing the jaws 262, 263 to spread apart as shown. Conversely, when one or both of the forces 272, 273 are relaxed such that the sum of the two forces becomes less than the synchronizing force applied by the coupler, the jaws 262, 263 may return the levers 202a, 202b to corresponding (aligned positions) positions.

FIG. 12C illustrates coupler functionality during a left hand turn. As shown in this view, a forward force 275 may be applied to the drive control lever 202b, while a reverse force 274 may be applied to the lever 202a. Once again, assuming the sum of the forces 274, 275 is greater than the synchronizing force of the coupler, the levers 202a, 202b may move to differential positions as shown by having the protrusions 224a, 224b act on jaws 262, 263, respectively, and effectively overcoming the biasing force of the spring 268 (see FIG. 10) and spreading the jaws apart.

The coupler thus effectively permits an operator to maintain and control straight-line travel of the vehicle by manipulation of either one of the drive control levers 202, leaving the other hand free to interact with other controls. However, when the operator desires to change vehicle direction, the levers 202 may be independently moved in opposite directions in a manner similar to a conventional twin-stick control system by applying a force to each of the levers, wherein the sum of the two forces is greater than the synchronizing force of the coupler 260 (of the biasing spring 268).

Other embodiments may provide a single transversely extending U- or V-shaped cam 402 pivotally attached to the chassis about the axis 231 (lever pivot axis) as shown in FIGS. 13A-13C. The cam 402 is not directly coupled to either of the drive control levers 202 (left lever 202a and right lever 202b) and, as such, is free to pivot about the axis 231 independently of the drive control levers 202. Each lever 202 may have attached thereto a biased, spring-loaded cam follower/roller 404 (404a, 404b) as shown in FIG. 13A, wherein the cam follower pivots about the pivot axis in correspondence with movement of its associated drive control lever. The bias of the cam follower 404 may force the follower toward/into an apex 406 of a cam surface 408 defined by the V-shaped cam 402. As a result, movement of one lever 202 (e.g., left lever 202a) may cause the V-shaped cam to rotate about the pivot axis 231 as shown in FIGS. 13B (forward) and 13C (reverse), which causes the cam follower 404 of the other lever (e.g., right lever 202b)—and thus the other lever itself—to move in correspondence with the first lever as the cam followers are biased to stay within the apex 406 of the V-shaped cam. Accordingly, the two drive control levers 202 may move in unison upon the application of a displacing force applied to either of the levers. However, when a differential force is applied between the two levers (e.g., the lever 202b is held in place (or pulled rearwardly) while the lever 202a is pushed forwardly (or held in place) as shown in FIG. 13B), one or both cam followers 404 may ride out of the apex of the V-shaped cam, permitting a vehicle turn. When the differential force is relieved, both cam followers may return to the apex of the V-shaped cam under the bias of the cam followers, resulting in the two drive control levers returning to equivalent and corresponding drive positions.

While shown with linear U or V-shaped cams, other cam profiles are also contemplated. For example, the cams could provide cam surfaces 408 having progressive rates of change such that different drive control resolution or sensitivity may be provided depending on the relative distance the levers are moved from the neutral position, and/or provide different lever resolution/sensitivity in reverse as opposed to forward propulsion.

In other embodiments, the levers 202 and follower/rollers 404 may be configured to be located at default positions other than the neutral position illustrated in FIG. 13A). For example, if the two rollers 404a, 404b were set to a default position resulting in their corresponding levers being in a forward propulsion position, the system may provide "cruise-control" functionality that could reduce operator fatigue during extending straight-line operations. Of course, forces to the levers that overcome the cam bias would result in vehicle turning, with the benefit of returning to the previous straight-ahead speed once such forces are removed.

Such cruise-control functionality (e.g., setting of the default lever/follower position) could be achieved manually by the operator adjusting a lever or knob that repositions the default follower location, e.g., by biasing the cam to a default location different than the neutral location shown in FIG. 13A. Alternatively, the default follower location could be controlled by an electronic controller. For instance, an equipment operator could input (e.g., via a control panel on the mower, or via a remote computer or mobile phone, etc.) into the control system an experience level of the operator, wherein a lower experience level entered could set or otherwise limit the cruise-control speed to a speed less than that set for a more experienced operator.

In other embodiments, the cruise-control speed could be set by the controller based upon vehicle operational parameters. For instance, the cruise control speed could be set to correspond with—or be set in response to—a detected engine (or electric motor) loading (e.g., set a lower cruise-control speed when under heavy load). Still further for example, the default cruise-control speed could be set or limited by the controller in response to other detected vehicle operating parameters (e.g., ground slope or grade as detected by a slope sensor or inertial measurement unit (IMU), detected linear and/or centripetal acceleration of the vehicle, detected wheel slip, detected torque or torque limitation at one or more of the drive wheels, etc.).

In yet other embodiments, the functions of the coupler could be accommodated electronically. For instance, each lever may be connected to a potentiometer and a motor. A controller may detect movement of the first lever based on the first lever's potentiometer signal. Based upon this detection, the motor associated with the second lever may move the second lever to a corresponding location. When the operator wishes to initiate a turn, the torque provided by the motors may be overcome by manual operator input forces to one or both levers. Once the force on the second lever is relieved, that lever may return to a position corresponding to the first lever.

In still other embodiments, the lever positions may be controlled with rare earth magnets or electromagnets. In such a configuration, the levers may move in unison under the influence of the magnets. However, the magnetic force can be overcome by operator inputs to the control levers (and/or changes in electrical current passing through the magnets in the case of electromagnets).

In yet other embodiments, the mechanical jaws described herein could be replaced with a coil spring having its coil positioned coaxial with the lever pivot axis. The coil spring may include a first leg operatively connected to the first lever, and a second leg operatively connected to the second lever. As a result, the coil spring may cause the second lever to move in unison with the first lever until a differential force is applied between to the two levers that exceeds the biasing force of the coil spring, at which point the levers may move to independent positions.

While couplers such as those described herein are described in the context of assisting straight-line vehicle travel via one-handed operation, such systems may have other uses. For instance, they may also be utilized to limit maximum drive wheel differential speed. That is to say, couplers in accordance with embodiments of the present disclosure could be configured to limit the speed of one transmission/drive member relative to the other transmission/drive member to, for example, limit the speed of the vehicle during a turn.

While described and illustrated herein as using two separate drive control levers, such a configuration is exemplary only. In other embodiments, systems such as those described herein may find application to the drive control levers that are joined to one another as taught by, for example, the unifying hand grip described and illustrated in U.S. Pat. No. 9,970,176.

The complete disclosure of the patents, patent documents, and publications cited herein are incorporated by reference in their entirety as if each were individually incorporated. In the event that any inconsistency exists between the disclosure of the present application and the disclosure(s) of any document incorporated herein by reference, the disclosure of the present application shall govern.

Illustrative embodiments are described and reference has been made to possible variations of the same. These and other variations, combinations, and modifications will be apparent to those skilled in the art, and it should be understood that the claims are not limited to the illustrative embodiments set forth herein.

What is claimed is:

1. A utility vehicle comprising:
   a chassis;
   first and second drive members attached to the chassis and supporting the chassis upon a ground surface;
   first and second transmissions attached to the chassis, the first and second transmissions operatively coupled to the first and second drive members, respectively;
   independent first and second drive control levers movably attached to the chassis, the first and second drive control levers each comprising: a shaft portion rotatably supported by the chassis, the shaft portion defining an axis; and an operator handle portion spaced-apart from the shaft portion, wherein the first and second drive control levers are operatively connected to the first and second transmissions, respectively, and wherein each drive control lever is configured to move between a neutral position corresponding to zero velocity of its respective drive member, and a first position corresponding to a forward velocity of its respective drive member; and
   a coupler positioned between each shaft portion and rotatable about the axis, the coupler engaged with a surface of the shaft portions of each of the first and second drive control levers, wherein the coupler comprises a biasing element configured to provide a synchronizing force between the first and second drive control levers whereby the coupler:
      upon application of a first force to the first drive control lever that results in movement of the first drive control lever to a position between the neutral position and the first position, causes movement of the second drive control lever to a corresponding position; and
      upon application of a second force to the second drive control lever that is in a direction opposite that of the first force, and in which a sum of the first and second forces exceeds the synchronizing force, causes the second drive control lever to move to a different position that lacks correspondence with the position of the first drive control lever.

2. The vehicle of claim 1, wherein the first and second drive control levers are pivotally attached to the chassis.

3. The vehicle of claim 1, wherein each transmission converts the movement of its associated drive control lever to a proportional output of the associated drive member.

4. A utility vehicle comprising:
   a chassis;
   first and second drive members attached to the chassis and supporting the chassis upon a ground surface;
   first and second transmissions attached to the chassis, the first and second transmissions operatively coupled to the first and second drive members, respectively;
   independent first and second drive control levers attached to the chassis and pivotable about a pivot axis, the first and second drive control levers operatively connected to the first and second transmissions, respectively, wherein each drive control lever is configured to move between a default position corresponding to a default velocity of its respective drive member, and a first position corresponding to a first velocity of its respective drive member, wherein both of the drive control levers are biased to their default positions; and
   a coupler interposed between the first and second drive control levers, wherein the coupler comprises a biasing element comprising one or more extension springs, the biasing element configured to provide a synchronizing force between the first and second drive control levers whereby the coupler:
      upon application of a first force to the first drive control lever that results in movement of the first drive control lever to a position between the default position and the first position, causes movement of the second drive control lever to a corresponding position; and
   upon application of a second force to the second drive control lever that is in a direction opposite that of the first force, and in which a sum of the first and second forces exceeds the synchronizing force, causes the second drive control lever to move to a different position that lacks correspondence with the position of the first drive control lever.

5. The vehicle of claim 4, wherein the first and second transmissions each comprise a hydraulic pump and motor.

6. The vehicle of claim 4, further comprising a first tie rod connecting the first drive control lever to the first transmission, and a second tie rod connecting the second drive control lever to the second transmission.

7. The vehicle of claim 4, wherein the coupler comprises:
two opposing jaws adapted to pivot about the pivot axis, wherein the biasing element is configured to bias the two opposing jaws toward one another; and
first and second ears secured to the first and second drive control levers, respectively, the first and second ears held captive between the two opposing jaws.

8. The vehicle of claim 4, further comprising a return-to-neutral (RTN) spring associated with each of the first and second drive control levers, each RTN spring configured to bias its associated drive control lever towards the default position.

9. The vehicle of claim 8, wherein each RTN spring is connected to its associated transmission.

10. The vehicle of claim 4, wherein each drive control lever is further pivotable to a second position corresponding to a reverse velocity of its respective drive member, wherein the coupler is configured, upon application of a reverse force applied to the first drive control lever that results in movement of the first drive control lever to a position between the default position and the second position, to produce corresponding movement of the second drive control lever.

11. The vehicle of claim 4, wherein the default position of each drive control lever is a neutral position corresponding to zero velocity of its respective drive member.

12. The vehicle of claim 4, wherein the default position of each drive control lever is a position between: a neutral position corresponding to zero velocity of its respective drive member; and the first position.

* * * * *